D. S. MACKENZIE.
DENTAL CASTING APPARATUS.
APPLICATION FILED MAY 4, 1911.
1,070,500.
Patented Aug. 19, 1913.
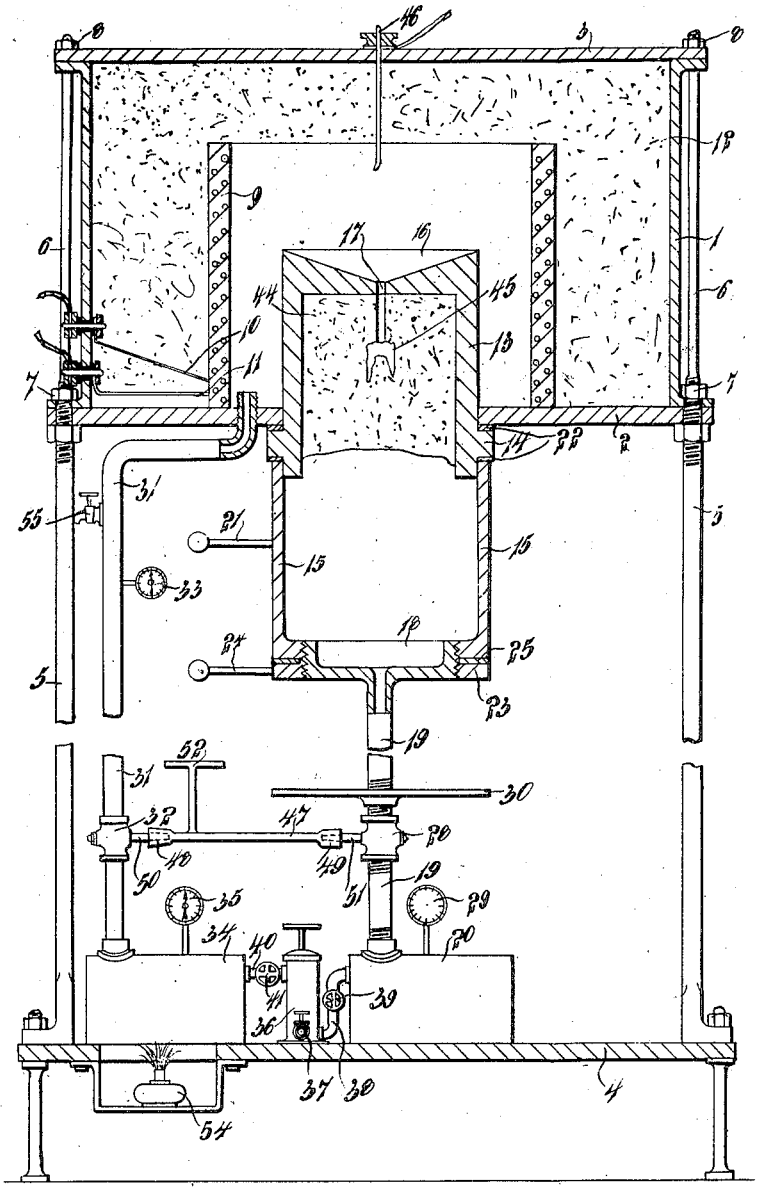
Witnesses
Fred R. Curtice
Joseph F. Sullivan
Inventor
David Stuart Mackenzie
by G. Croydon Marks
Attorney

UNITED STATES PATENT OFFICE.

DAVID STUART MACKENZIE, OF LEVIN, NEW ZEALAND.

DENTAL CASTING APPARATUS.

1,070,500.  Specification of Letters Patent.  Patented Aug. 19, 1913.

Application filed May 4, 1911. Serial No. 625,007.

*To all whom it may concern:*

Be it known that I, DAVID STUART MACKENZIE, a citizen of the Dominion of New Zealand, and residing at Levin, in the Provincial District of Wellington, New Zealand, have invented certain new and useful Improvements in Dental Casting Apparatus, of which the following is a specification.

This invention relates to the manufacture of metal castings, and provides apparatus whereby dental castings may be made in a better manner, and with greater certainty of success than heretofore.

This invention consists of the parts, constructions, and method of operation, hereinafter set forth and claimed.

The drawing herewith is a sectional elevation of the apparatus.

A casing 1 secured to a plate 2 has an airtight cover 3. The plate 2 is supported upon a base plate 4 by pillars 5 having extensions 6 and nuts 7, the cover 3 being held by nuts 8. The casing contains an electric muffle 9 heated by a current of electricity derived from any suitable source of supply, and entering the casing and muffle by wires 10 and 11. Radiation of heat from the muffle is prevented by packing the interior of the casing around and above the muffle with asbestos 12.

A retort 13, made of fireclay or other refractory material, is adapted to pass through a hole in the plate 2 and has an integral collar 14 which is held airtight against the said plate by a cup-shaped presser 15 having its rim bearing upon the collar 14. The retort 13 has a depression 16 to hold the metal to be melted and a passage or gate 17 leads from the depression to the interior of the retort. The presser has a hole in the bottom screw-threaded to screw upon the head 18 of a pipe 19 communicating with a vacuum vessel 20. A holder 21 upon the presser 15 enables the said presser to be screwed upon the head 18. Asbestos washers 22 are provided upon each side of the collar 14 for the purpose of making airtight joints.

A lock-nut 23 upon the head 18 has a handle 24, and makes an airtight joint with the presser 15 by means of an asbestos washer 25. The pipe 19 is provided with a stopcock 28, and the vacuum vessel 20 has a vacuum gage 29. To extract the retort 13, the lock-nut 23 is unscrewed and allowed to fall upon a tray 30 secured to the pipe 19. The presser 15 is then screwed downward until it is free of the head 18, after which it is allowed to fall upon the lock-nut 23 which is already resting upon the plate 30. The retort 13 can then be readily withdrawn. A pipe 31 provided with a stop-cock 32 and a pressure gage 33 above the said stop-cock connects a vessel 34 containing compressed air to the interior of the muffle 9. The said vessel is provided with a pressure gage 35.

A vacuum in the vessel 20 is created by an air pump 36 which draws the air from the vessel 20 and delivers it into the vessel 34. When the air in the vessel 20 becomes too attenuated for delivery into the vessel 34, a stop-cock 37 is opened at the bottom of the pump to admit air from the atmosphere into the said pump 36. Communication between the vessel 20 and the pump 36 is afforded by a pipe 38 furnished with a stop-cock 39, and a pipe 40 provided with a cock 41 connects the pump to the vessel 34. The cocks 39 and 41 can be shut when a vacuum has been obtained in the vessel 20 and when pressure has been formed in the vessel 34.

The mold is prepared in the ordinary way by filling the retort with investment material 44 wherein a mold 45 has been formed by a wax pattern or model. The retort is placed in position as shown in the drawing with the material to be melted placed in the depression 16, and the muffle 9 heated by switching on the current of electricity by the wires 10 and 11.

A pyrometer of ordinary construction connected to wire 46 of platinum or the like, indicates the temperature within the interior of the muffle 9, and when a temperature has been applied to the metal of sufficient height and length of time to melt the metal in the depression 16, the cocks 28 and 32 are simultaneously opened by turning a double ended key 47 having end sockets 48 and 49 fitting the spindles 50 and 51 of the cocks 32 and 28 respectively. The key 47 has an integral handle or lever 52 whereby the key is rotated. The opening of the cock 28 creates a vacuum in the investment 44 below the mold 45, and the opening of the cock 32 admits compressed air to the interior of the muffle 9. The simultaneous opening of the cocks 28 and 32 causes the vacuum and compressed air to be applied simultaneously. By making the admission of the pipe 31 at the bottom of the muffle 9 the compressed air is heated before it reaches the metal in the depression 16. The compressed air is also previously heated in the vessel 34 by a lamp 54, or other source of heat. The gage 33 enables the air pressure in the muffle to be ascertained when the cock 32 is closed, and a cock 55 in the pipe 31 and above the gage 33, allows the compressed air to escape from the muffle previous to the uncoupling of the presser 15. The effect of using a vacuum below and air pressure above the mold is that the castings obtained are sound and free from blowholes throughout.

What I do claim and desire to secure by Letters Patent of the United States is:—

1. A casting apparatus, comprising in combination, a casing, a retort extending into said casing and having a mold therein, means in said casing for heating said retort, means for supplying compressed fluid to one side of the mold in said retort, a presser adapted to be moved into and out of engagement with said retort, a support for said presser, a passage through said support leading to said retort, and means for creating a reduced pressure in said passage.

2. A casting apparatus, comprising in combination, a casing, a retort extending into said casing and having a mold therein, means in said casing for heating said retort, means for supplying compressed fluid to one side of the mold in said retort, means for creating a reduced pressure on the other side thereof, and a presser adapted to be moved into engagement with the outside of said retort, said presser being first moved longitudinally and then rotated to hold said retort in position.

3. A casting apparatus, comprising in combination, a casing, a retort extending into said casing and having a mold therein, means in said casing for heating said retort, means for supplying compressed fluid to one side of the mold in said retort, means for creating a reduced pressure on the other side thereof, a presser adapted to be moved into engagement with the outside of said retort, screw-threads formed on said presser, and a screw-threaded member for supporting said presser, the presser being normally out of engagement with said screw-threaded member, but being movable longitudinally to engage said screw-threads and then rotatable to firmly hold said retort in position.

4. A casting apparatus, comprising in combination a casing, a retort extending into said casing and having a mold therein, means in said casing for heating said retort, means for supplying compressed fluid to one side of the mold in said retort, a hollow presser engaging the outside of said retort for holding it in position in said casing, an opening in said retort communicating with said hollow presser, means for creating a vacuum in said presser and means for moving said presser into and out of engagement with said retort.

5. A casting apparatus comprising in combination a casing, a retort extending into said casing and having a mold therein, means in said casing for heating said retort, means for supplying compressed fluid to one side of the mold in said retort, a hollow presser engaging the outside of said retort for holding it in position in said casing, an opening in said retort communicating with said presser, a screw-threaded portion on said presser, a screw-threaded member engaging therewith, a hollow support for said screw-threaded member, communicating therethrough with said hollow presser, means connected to said hollow support for producing a vacuum in the hollow presser and means for causing relative rotary motion between the presser and screw-threaded member for moving said presser into and out of engagement with said retort.

6. A casting apparatus, comprising in combination a casing, a retort extending into said casing and having a mold therein, a space in said casing communicating with one side of the mold in said retort, a pipe for supplying compressed fluid to said space, means in said casing for heating said retort and the fluid in said space, a hollow presser engaging the outside of said retort for holding it in position in said casing, an opening in said retort communicating with said presser, means for moving said presser into and out of engagement with said retort, a pipe connected to said presser, means connected to said pipe for producing a vacuum in said presser, a valve in each of said pipes, a bar having means at each end for engaging the stems of said valves, and means for operating said bar to simultaneously open or close said valves.

7. A casting apparatus, comprising in combination a retort extending into said casing and having a mold therein, an electric muffle in said casing for heating said retort, means for supplying compressed fluid to one side of the mold in the retort, means for creating a vacuum on the other side thereof, a flange formed on said retort engaging the outside of said casing, a presser engaging said flange for holding the retort in position in said casing, washers arranged between said flange and casing and presser for forming fluid tight joints and means for moving said presser into and out of engagement with said flange.

8. A casting apparatus, comprising in combination a casing, a retort extending into said casing and having a mold therein, an electric muffle in said casing for heating said retort, a space in said casing between said muffle and retort, a pipe for supplying compressed fluid to said space, a hollow presser engaging the outside of said retort for holding it in position in said casing, an opening in said retort communicating with said presser, a screw-threaded portion on said presser, a screw-threaded member engaging therewith, a hollow support for said member, means connected therewith for producing a vacuum in said presser, a screw-threaded locking member working on said screw-threaded member and engaging said presser, handles connected to said presser and locking member for rotating them, a tray carried by said hollow support, valves in said pipe and hollow support, a bar having means at each end thereof to engage the stems of said valves and a handle extending from said bar for rotating it to simultaneously open and close said valves.

In testimony whereof I have signed my name to this specification in the presence of two witnesses.

DAVID STUART MACKENZIE.

Witnesses:
ERNEST SMITH BALDWIN,
ANNIE DOROTHY McKENZIE.